US006768610B1

(12) United States Patent
Morris et al.

(10) Patent No.: US 6,768,610 B1
(45) Date of Patent: Jul. 27, 2004

(54) MICROACTUATOR SERVO SYSTEM IN A DISC DRIVE

(75) Inventors: John C. Morris, Minneapolis, MN (US); Randall D. Hampshire, Agra, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 1294 days.

(21) Appl. No.: 08/924,552

(22) Filed: Aug. 27, 1997

(51) Int. Cl.$^7$ .............................................. G11B 5/596
(52) U.S. Cl. .................................................. 360/78.07
(58) Field of Search ........................... 360/78.05, 78.12

(56) References Cited

U.S. PATENT DOCUMENTS

| | | | | |
|---|---|---|---|---|
| 4,858,040 A | * | 8/1989 | Hazebrouck | 360/78.12 X |
| 5,061,914 A | * | 10/1991 | Busch et al. | 360/78.12 X |
| 5,189,578 A | * | 2/1993 | Mori et al. | 360/78.05 X |
| 5,291,355 A | | 3/1994 | Hatch et al. | 360/97.01 |
| 5,325,244 A | * | 6/1994 | Takano et al. | 360/78.05 X |
| 5,378,954 A | | 1/1995 | Higuchi et al. | 310/309 |
| 5,404,255 A | * | 4/1995 | Kobayashi et al. | 360/78.05 X |
| 5,446,609 A | | 8/1995 | Thanos et al. | 360/97.02 |
| 5,477,103 A | | 12/1995 | Romano et al. | 318/601 |
| 5,493,156 A | * | 2/1996 | Okada | 310/83 X |
| 5,519,605 A | | 5/1996 | Cawlfield | 364/151 |
| 5,586,306 A | | 12/1996 | Romano et al. | 395/500 |
| 5,745,319 A | * | 4/1998 | Takekado et al. | 360/78.05 |

FOREIGN PATENT DOCUMENTS

JP 0134873 * 6/1991 ............ 360/78.05

OTHER PUBLICATIONS

D. Miu; Silicon miroactuators for rigid disk drives; Data Storage; p. 33,34,36,37,38,40, Jul. 1995.*
Mikkio Kamoshita, Tracking Control of an Optical Disk Drive Using U–Analysis and Synthesis, Proceedings of the 34th Conference of Decisions & Control, New Orleans, LA—Dec. 1995, pp. 873 and 874.

* cited by examiner

*Primary Examiner*—David Hudspeth
*Assistant Examiner*—K. Wong
(74) *Attorney, Agent, or Firm*—Joseph R. Kelly; Westman, Champlin & Kelly, P.A.

(57) ABSTRACT

A method and apparatus position a plurality of data heads relative to a plurality of surfaces of at least one disc in a disc drive. One of the plurality of data heads corresponds to each of the plurality of surfaces. The data heads are provided for writing information to the surfaces and reading information from the surfaces. Each of the data heads may be simultaneously positioned relative to the corresponding surfaces using the embedded servo information. Information can be simultaneously transferred relative to the corresponding surfaces using the plurality of data heads. Uninterrupted sequential data transfers may also be executed without servo overhead. Further, an apparatus is provided for accomplishing such servo control, as is a method of accomplishing model-based servo control.

26 Claims, 10 Drawing Sheets

MICROACTUATOR SERVO SYSTEM IN A DISC DRIVE

FIELD OF THE INVENTION

The present invention relates generally to a servo system in a disc drive. More particularly, the present invention relates to developing and implementing a servo system for controlling microactuators in a disc drive to accomplish simultaneous data transfer from multiple heads on multiple discs relative to the discs, or to accomplish sequential data transfers or short track seeks without incurring servo overhead.

BACKGROUND OF THE INVENTION

A typical disc drive includes one or more magnetic discs mounted for rotation on a hub or spindle. A typical disc drive also includes one or more transducers supported by a hydrodynamic air bearing which flies above each magnetic disc. The transducers and the hydrodynamic air bearing are collectively referred to as a data head. A drive controller is conventionally used for controlling the disc drive system based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored on the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is then decoded by the drive controller to recover the data represented by flux reversals stored on a magnetic disc, and consequently represented in the read signal provided by the data head.

Accurate positioning of the data head over a track on the disc is of great importance in writing data to the disc and reading data from the disc.

In prior systems, servo operations were accomplished based on a dedicated servo head. In a dedicated servo type of system, servo information is all written to one dedicated surface of a disc in the disc drive. All of the heads in the disc drive are mechanically coupled to the servo head which is used to access the servo information. Thus, all of the heads in the dedicated servo disc drive are positioned based on the servo information read from the servo surface. This type of system allows the disc drive to conveniently execute parallel read and write operations. In other words, with appropriate circuitry in the drive controller, read and write operations can be executed in parallel using a plurality of the data heads mounted on the actuator, the data heads being simultaneously positioned based on the servo information read from the dedicated servo surface.

However, track densities on magnetic discs have been increasing for many years. Increased track densities on the magnetic disc require more accurate and higher resolution positioning. The mechanical offset between heads in a dedicated servo system can exceed one track width. Thus, the industry has seen a shift to embedded servo information in certain applications.

In an embedded servo system, servo information is embedded on each track on each surface of every disc. Thus, each data head returns a position signal independently of the other data heads. Therefore, the servo actuator is used to position each individual data head while that particular data head is accessing information on the disc surface. The positioning is accomplished using the embedded servo data for the track over which the data head is then flying.

While this results in increased positioning accuracy and higher resolution in the positioning process (because the data head is positioned independently of any other data heads), certain disadvantages are encountered because of increased track density and mechanics. One of the disadvantages is that in typical embedded servo systems, the ability to execute parallel read and write operations using a plurality of heads is lost. That is because the servo system is positioning based on information received by one individual data head, and the mechanical tolerances are inadequate to accurately position the other data heads in high track density systems. Also, current actuators are incapable of independently positioning the data heads. Thus, embedded servo systems, to date, have been unable to execute parallel read and write operations, such as simultaneously reading or writing a full cylinder in a disc drive.

Conventional servo actuators in conventional servo systems also present other disadvantages. For example, during a sequential reading or writing operation, the overhead associated with a servo operation is a significant cause for reduced throughput.

The present sequence for each sequential data transfer is to position a head over a data track, allow the disc drive controller to transfer all of the data to that track (which takes one revolution of the disc). Then the disc drive controller commands the servo processor to switch to the next head and position the servo actuator based on servo information retrieved from that head. The servo processor then electronically moves the servo actuator to position the new head over the new data track. When the new head is in position, the servo processor indicates to the controller that it can now continue transferring data.

The servo overhead in sequential operations is the time required for the servo actuator to position the next data head which will be writing or reading information to the center of the data track over which it is to read or write the information, from the position of the center of the track over which the previous data head was reading or writing information. Generally this is approximately 0.5 to 5 milliseconds. During this time, the sequential transfer of data is interrupted.

This overhead also prevents the provision of a continuous uninterrupted data stream when reading from and writing to the disc. This can be a significant disadvantage when reading and writing audio and video information, or when writing to a CD ROM from data stored on a hard disc drive.

The present invention provides a solution to these and other problems, and offers other advantages over the prior art.

SUMMARY OF THE INVENTION

The present invention relates to a system which is directed to solving one or more of the above-mentioned problems.

In accordance with one embodiment of the invention, a method is provided for transferring information relative to a plurality of surfaces of at least one disc in a disc drive. The surfaces have embedded servo information thereon. A plurality of data heads are provided, and each data head corresponds to one of the plurality of surfaces. The data heads are simultaneously positioned relative to the corresponding surfaces using the embedded servo information from the surfaces. Information is simultaneously transferred relative to the corresponding surfaces using the plurality of data heads.

The present invention may also be implemented as a method for controlling the position of a plurality of data heads relative to the corresponding disc surfaces. The method includes controlling movement of each of the plurality of data heads based on movement of the other of the plurality of data heads.

Further, the present invention can be implemented as a method of accomplishing sequential data transfers substantially without any servo overhead.

Also, the present invention can be implemented as an apparatus for accomplishing servo positioning in a disc drive. The apparatus includes a multiple input, multiple output, servo controller coupled to a plurality of microactuators. The microactuators are coupled to the data heads to position each of the data heads relative to the corresponding disc surfaces independently of one another. In another embodiment, the present invention includes a system which positions each of the data heads, using the microactuators, relative to a coarse servo actuator which is used to position all of the data heads relative to the disc surfaces.

The present invention further includes a model-based servo controller for controlling the coarse actuator and the microactuator.

These and various other features as well as advantages which characterize the present invention will be apparent upon reading the following detailed description and review of the associated drawings.

BRIEF DESCRIPTION OF THE DRAWINGS

FIGS. 4-1 and 4-4 illustrate the operation of a microactuator in accordance with one embodiment of the present invention.

FIGS. 9-1 and 9-2 illustrate a flow diagram showing the operation of a disc drive in accordance with one aspect of the present invention executing a sequential data transfer.

DETAILED DESCRIPTION OF THE PREFERRED EMBODIMENTS

Figure 1:
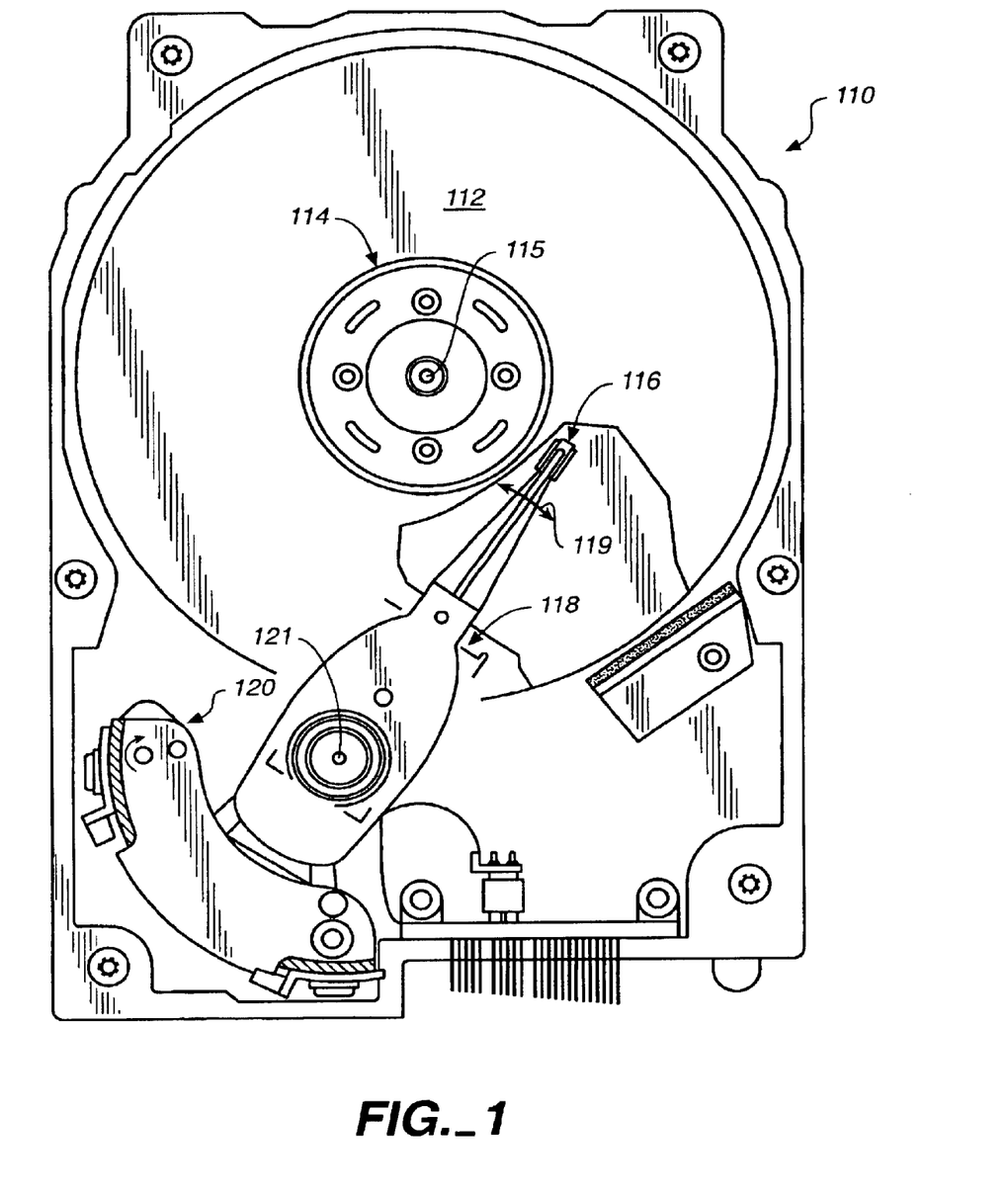
FIG. 1 illustrates a disc drive in accordance with one embodiment of the present invention.

FIG. 1 is a plan view of a typical disc drive 110. Disc drive 110 includes a disc pack 112, which is mounted on a spindle motor (not shown) by a disc clamp 114. Disc pack 112, in one preferred embodiment, includes a plurality of individual discs which are mounted for co-rotation about a central axis 115. Each disc surface on which data is stored has an associated head gimbal assembly (HGA) 116 which is mounted to an actuator assembly 118 in disc drive 110. The actuator assembly shown in FIG. 1 is of the type known as a rotary moving coil actuator and includes a voice coil motor (VCM) shown generally at 120. Voice coil motor 120 rotates actuator assembly 118 with its attached HGAs 116 about a pivot axis 121 to position HGAs 116 over desired data tracks on the associated disc surfaces, under the control of electronic circuitry housed within disc drive 110.

More specifically, actuator assembly 118 pivots about axis 121 to rotate head gimbal assemblies 116 generally along an arc 119 which causes each head gimbal assembly 116 to be positioned over a desired one of the tracks on the surfaces of discs in disc pack 112. HGAs 116 can be moved from tracks lying on the innermost radius, to tracks lying on the outermost radius of the discs. Each head gimbal assembly 116 has a gimbal which resiliently supports a slider relative to a load beam so that the slider can follow the topography of the disc. The slider, in turn, includes a transducer which is utilized for encoding flux reversals on, and reading flux reversals from, the surface of the disc over which it is flying.

Figure 2:
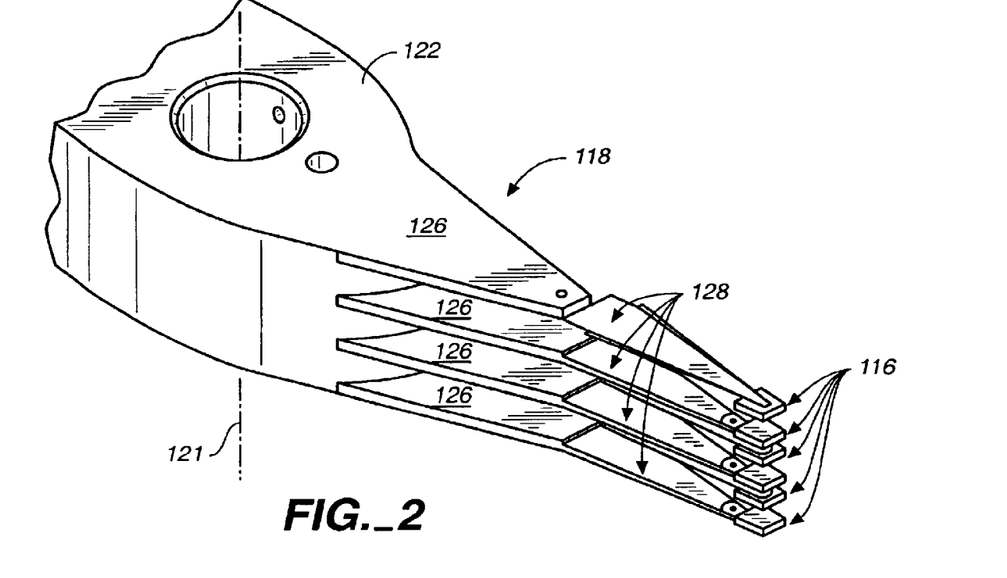
FIG. 2 illustrates an actuator assembly in accordance with one embodiment of the present invention.

FIG. 2 is a perspective view of actuator assembly 118. Actuator assembly 118 includes base portion 122, a plurality of actuator arms 126, a plurality of load beams 128, and a plurality of head gimbal assemblies 116. Base portion 122 includes a bore which is, in the preferred embodiment, coupled for pivotal movement about axis 121. Actuator arms 126 extend from base portion 122 and are each coupled to the first end of either one or two load beams 128. Load beams 128 each have a second end which is coupled to a head gimbal assembly 116.

Figure 3:
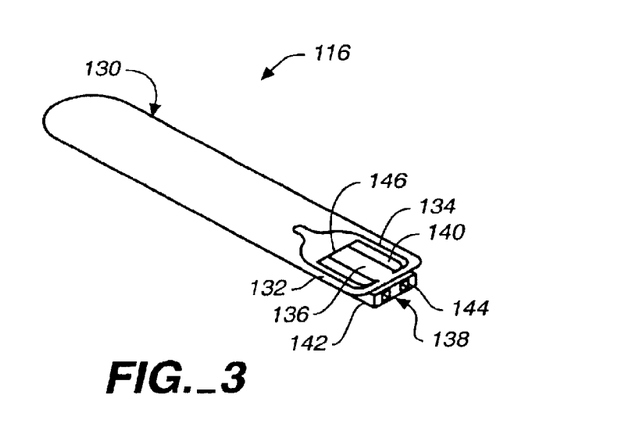
FIG. 3 illustrates a head gimbal assembly in accordance with one feature of the present invention.

FIG. 3 illustrates a greatly enlarged view of a head gimbal assembly 116. Head gimbal assembly 116 includes gimbal 130, which has a pair of struts 132 and 134, and a gimbal bond tongue 136. Head gimbal assembly 116 also includes slider 138 which has an upper surface 140 and a lower, air bearing surface 142. Transducers 144 are also preferably located on a leading edge of slider 138. The particular attachment between slider 138 and gimbal 130 is accomplished in any desired manner. Briefly, in one preferred embodiment, a compliant sheer layer is preferably coupled between the upper surface 140 of slider 138 and a lower surface of gimbal bond tongue 136, with an adhesive. The compliant sheer layer permits relative lateral motion between slider 138 and gimbal bond tongue 136. The compliant sheer layer is preferably a mylar film having a thickness of approximately 150 microns. Also, gimbal bond tongue 136 preferably terminates at a trailing edge of slider 138 with a mounting tab 146 which provides a surface at which slider 138 is attached to gimbal bond tongue 136.

Figure 41:
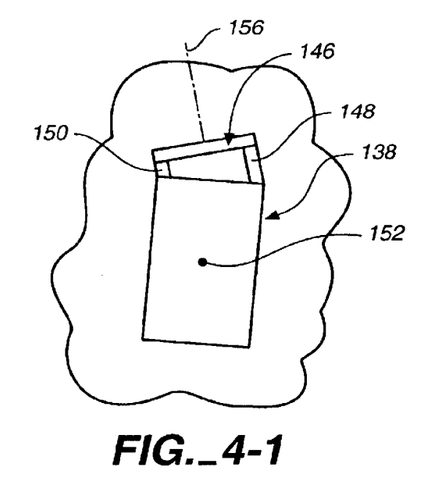
Figure 42:
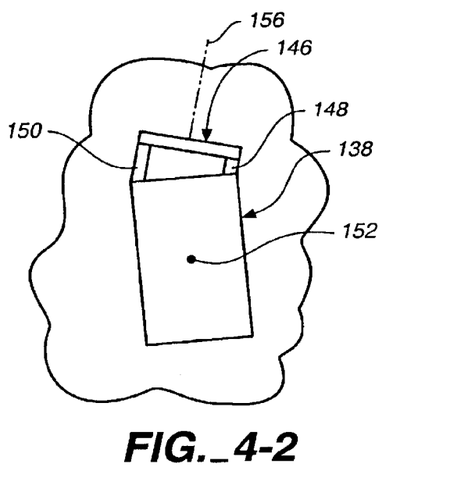

FIGS. 4-1 and 4-2 illustrate slider 138 mounting tab 146, and microactuators 148 and 150 which mount slider 138 to mounting tab 146. Microactuators 148 and 150 are preferably fabricated on a leading surface or edge of slider 138 using traditional thin-film processes that are used to fabricate recording heads. Microactuators 148 and 150 are, in turn, coupled to slider mounting tab 146. Preferably, microactuator 148 is secured at a first side of the leading edge of slider 138, and microactuator 150 is secured at a second, opposite side of the leading edge of slider 138. However, a single microactuator located on one side of the leading edge can also be used.

A flexible cable assembly is preferably routed along the load beam 128 supporting slider 138. The flexible cable assembly includes conductors for applying appropriate signals to transducer 144, and also conductors for applying appropriate signals to microactuators 148 and 150. Electrical signals applied through the conductors coupled to microactuators 148 and 150 selectively expand and contract a relative distance between each side of the leading edge of slider 138 and mounting tab 146 to actuate slider 138 relative to a yaw axis 152 which extends in and out of the page of FIGS. 4-1 and 4-2. Actuating slider 138 relative to yaw axis 152 moves transducers 144 laterally relative to a longitudinal axis of suspension 156 which allows micropositioning of transducers 144, during read and write operations, relative to the surface of the disc.

In FIG. 4-1, microactuator 150 is contracted and microactuator 148 is expanded such that slider 138 is actuated about yaw axis 152 in a clockwise direction. In FIG. 4-2, microactuator 150 is expanded and microactuator 148 is contracted such that slider 138 is actuated about yaw axis 152 in a counter-clockwise direction.

Figure 43:
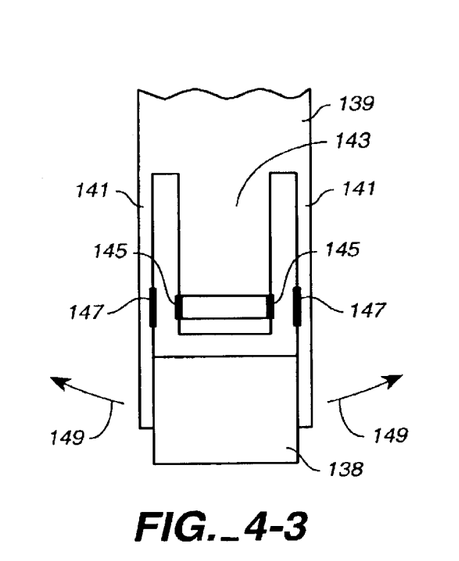

FIG. 4-3 illustrates another configuration for microactuator movement of transducers 144 relative to the main actuator (or voice coil motor) and relative to the disc surface. In FIG. 4-3, slider 138 is supported via suspension 139 which includes a pair of cantilevered beams 141, and an intermediate tongue 143. Tongue 143 and beams 141 have opposing microactuator components 145 and 147 disposed thereon, respectively. In one preferred embodiment, microacuators 145 include pole pieces surrounded by magnetic coils, wherein the coils are connected to a power supply in the disc drive. Microactuator components 147 comprise interactive magnetic pieces. Therefore, when one of the microactuator members 145 is actuated (by passing a current through the coil wrapped about the pole piece) electromagnetic force is generated which causes attraction between that microactuator member 145 and its associated interactive member 147. This causes the cantilevered beams to deflect such that those two pieces are closer together. By contrast, when the other microactuator member 145 is actuated, this causes the cantilevered beams to deflect in the other direction. This actuation causes the cantilevered beams to selectively deflect in the directions indicated by arrows 149.

Figure 44:
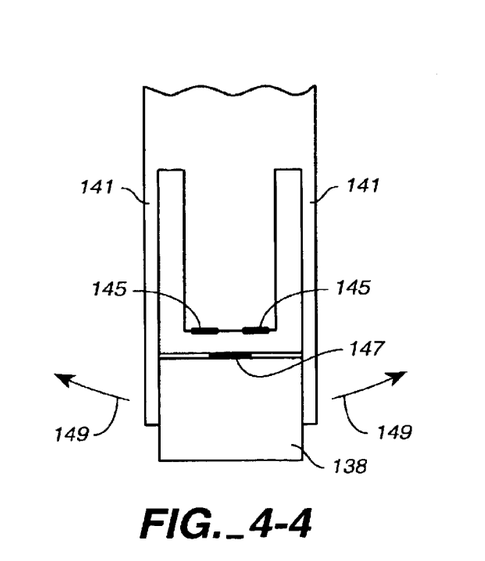

FIG. 4-4 illustrates yet another configuration for microactuation. FIG. 4-4 is similar to FIG. 4-3, and similar items are correspondingly numbered. However, only one interactive microactuator element 147 is used, and the two microactuator elements 145 are disposed on a tip of intermediate tongue 143. Thus, as microactuator members 145 are selectively actuated, the attraction between the elements 145 and 147 is used to deflect the cantilevered beams 141 selectively in the direction indicated by arrows 149.

Of course, it should be noted that in the above descriptions with respect to FIGS. 4-1 to 4-4, the microactuator members could be formed of PZT material, electrostatic material arranged to deflect accordingly, capacitive, fluidic, or thermally activated.

Figure 5:
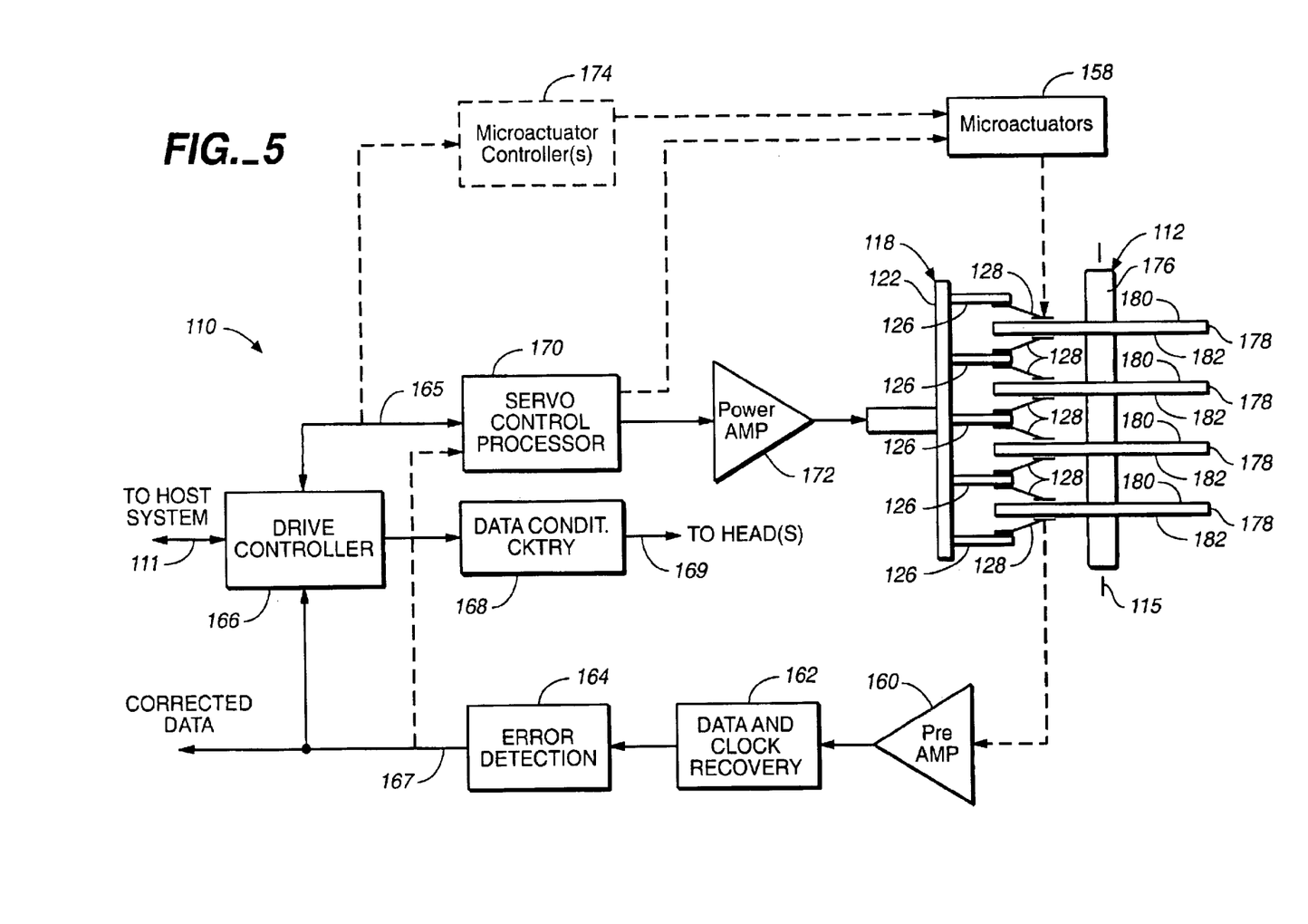
FIG. 5 is a block diagram of a portion of the disc drive in accordance with one embodiment of the present invention.

FIG. 5 is a block diagram of a portion of a disc drive 110, which illustrates a servo position control circuit in accordance with one aspect of the present invention. The portion of disc drive 110 which is illustrated in FIG. 5 includes actuator assembly 118, disc pack 112, microactuators associated with each head gimbal assembly (collectively referred to as microactuators 158), preamplifier 160, data and clock recovery circuit 162, error detection circuit 164, drive controller 166, data conditioning circuit 168, servo control processor 170, power amplifier 172, and optional microactuator controller(s) 174.

Drive controller 166 is preferably a microprocessor or digital computer, or other suitable microcontroller, and is coupled by bus 111 to a host system or another drive controller which controls the plurality of drives.

Disc pack 112 includes spindle 176 which supports a plurality of coaxially arranged discs 178. Each disc 178 is mounted for rotation with spindle 176 about axis of rotation 115. Each disk 178 has a first surface 180 and a second surface 182. Surfaces 180 and 182 include concentric tracks for receiving and storing data in the form of flux reversals encoded on the tracks.

As described with respect to FIGS. 2 and 3, actuator assembly 118 includes base portion 122 supporting the plurality of actuator arms 126. Each of the actuator arms 126 is coupled to at least one of the load beams 128. Load beams 128, in turn, each support one of the head gimbal assemblies 116 (labeled in FIG. 3) above corresponding disc surfaces 180 or 182 for accessing data within the tracks on the disc surface. Each gimbal assembly also includes at least one microactuator 158, as described above, for positioning the transducers on the head gimbal assemblies within a track, or on one of a plurality of different tracks, on disc 178.

In operation, drive controller 112 typically receives a command signal from a host system which indicates that a certain portion of one or more of discs 178 are to be accessed. In response to the command signal, drive controller 166 provides servo control processor 170 with a position (or reference) signal 165 which indicates a particular cylinder over which actuator assembly 118 is to position head gimbal assemblies 116. Servo control processor 170 converts the position signal into an analog signal which is amplified by power amplifier 172 and is provided to the voice coil motor in actuator assembly 118. In response to the analog position signal, actuator assembly 118 positions load beams 128 and their associated head gimbal assemblies 116 over a desired cylinder.

The head gimbal assemblies 116 generate a read signal containing data from embedded servo position data which is stored on a selected portion of each track of the disc to be read, as well as normal data to be accessed from the selected portion of the disc to be read. The read signal is provided to preamplifier 160 which amplifies the read signal and provides it to data and clock recovery circuit 162. Data and clock recovery circuit 162 recovers data from the read signal, which is encoded on the disc surface when the data is written to the disc surface, in a known manner. Of course, data and clock recovery circuit 162 can be a PRML channel, or another suitable type of read channel.

Once the data is recovered, it is provided to error detection circuit 164 which detects whether any errors have occurred in the data read back from the disc and which provides an output 167. Errors are corrected by error detection circuit 164 or drive controller 166, or a combination of both, in a known manner.

During head positioning, drive controller 166 provides a position signal to servo control processor 170 causing actuator assembly 118 to position head gimbal assemblies 116 over a selected cylinder. In a sector servo positioning drive (or an embedded servo positioning drive), a portion of each sector on the disc surfaces has position information which is encoded thereon and which is read by the data head and provided, through the read channel, to servo control processor 170. The positioning information not only gives coarse position information indicating the particular track over which the data head is flying, it also provides tuning feedback to the servo control processor for better positioning. Servo control processor 170 reacts to the position information read from the disc and positions the head gimbal assemblies 116 accordingly.

In one preferred embodiment, servo control processor 170 is used to not only control the coarse actuator (voice coil motor) but it is also used to control the microactuators 158. In another preferred embodiment, a separate microactuator controller (or plurality of separate microactuator controllers) 174 are provided for controlling the microactuators 158 in response to the position request signal from drive controller 166 and also in response to the embedded position information read from the discs.

In order to write information to the discs, drive controller 166 receives not only the location of the information to be written on disc pack 112, but also receives the actual data to be written. The location information is provided to servo control processor 170 (and optionally microactuator controller(s) 174) as a reference signal to coarsely position the data heads relative to the corresponding disc surfaces. Then, drive controller 166 provides the data to be written to data conditioning circuitry 168, which in turn provides that information at an output 169 to the particular transducers on the head gimbal assemblies 116 so that the data can be written to the disc surfaces, in a known manner.

In the preferred embodiment, microactuators 158 have a range of motion which is in excess of the worst case mechanical misalignment between any two of the head assemblies 116 supported by actuator assembly 118. In an even more preferred embodiment, each microactuator 158 has a range of motion which is in excess of one track width, and even more preferably in excess of a plurality of track widths. Also, in the preferred embodiment, the read channel provided in disc drive 110 (which in the embodiment shown in FIG. 5 includes preamp 160, data and clock recovery circuit 162 and error detection circuit 164) is capable of receiving a plurality of simultaneous and parallel data signals and processing those data signals in parallel, and providing them to the host system, and/or drive controller 166 in parallel. Further, in the preferred embodiment, data conditioning circuitry 168 is also preferably suitable for providing a plurality of simultaneous and parallel write signals to the data heads to execute a simultaneous and parallel write operation. Further, in the preferred embodiment, servo controller processor 170 and optional microactuator controller(s) 174 are suitable for simultaneously providing positioning signals to microactuators 158 to simultaneously position all, or at least a plurality of, the microactuators so that a plurality of heads can be simultaneously aligned with tracks on a plurality of disc surfaces in disc pack 112.

With this arrangement, a number of advantages are achieved by the present invention. For example, precise position control can be accomplished on each of a plurality of the data heads. This allows precise and simultaneous track following on the plurality of data heads to allow parallel read and write operations. Further, because the bandwidth of the microactuator operation is much higher than that of the voice coil motor, the present invention provides the ability to significantly increase the track density on any given disc surface because it accommodates bearing non-linearity, and other problems which limit the track density of the current art, in a far superior fashion to simply using the voice coil motor.

Further, since in the preferred embodiment, each microactuator has a range of motion which is in excess of a plurality of data tracks, the microactuators, themselves, can be used to execute short seek operations (seek operations which seek to a track within the range of motion of the microactuator). This minimizes the excitation of structural modes in the disc drives and enables higher bandwidth servo-control during the short seeks.

Microactuators 158 can be controlled in any of a number of ways in accordance with the present invention. For example, the voice coil motor in a conventional disc drive is controlled by a servo controller which is a single input/singe output (SISO) system. The input is the head position measurement. taken from the embedded servo data, and the output typically drives the voice coil motor through the power amplifier 172. However, in controlling microactuators 158, the servo control system of the present invention must have multiple inputs and multiple outputs. The inputs include the head positions read from the embedded servo information over which the heads are flying, and may also optionally, include the relative positions of one or more of the microactuators, relative to the voice coil motor (or coarse actuator). The multiple outputs include the outputs which drive the single coarse positioner (VCM) and a number N of the microactuators.

Transitioning, in accordance with the present invention, from the SISO servo control system to a multiple input multiple output (MIMO) servo control system can, in one preferred embodiment, be based on a generalization of standard proportional-integral-derivative (PID) control. In decentralizing the PID control, a separate PID control loop is provided for each microactuator channel, and one is also provided for the VCM (coarse actuator). Such a system is illustrated in FIG. 6.

Figure 6:
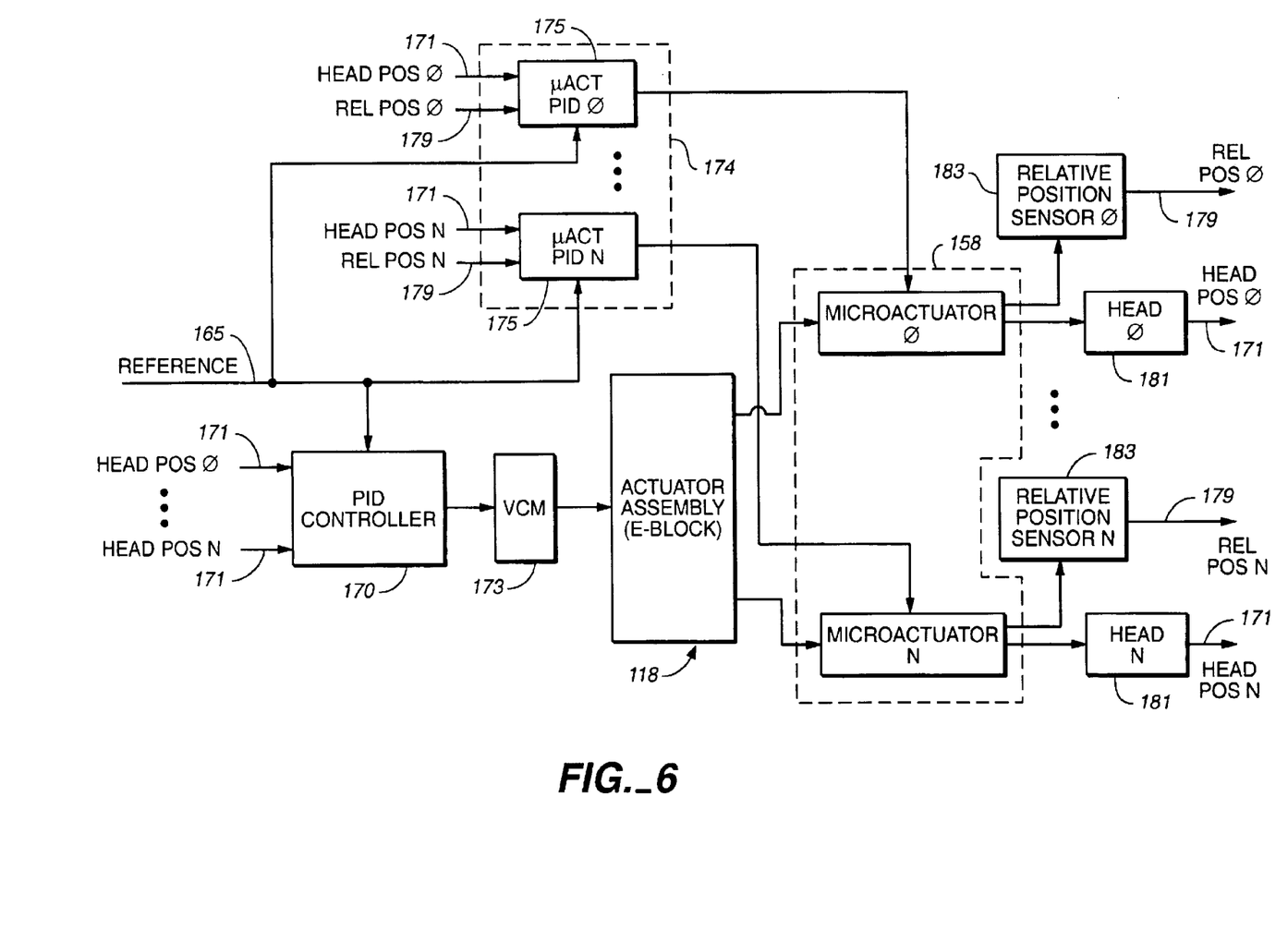
FIG. 6 is a block diagram of a portion of a servo control circuit in accordance with one embodiment of the present invention.

FIG. 6 illustrates that servo control processor 170 is implemented as a PID controller which receives as its inputs the head positions 171 for all of the heads (head 0–head N). The output of the PID controller is directed to the voice coil motor 173 which drives actuator assembly (or E-block) 118. FIG. 6 also illustrates that microactuator controllers 174 include individual microactuator PID controllers 175 (0–N) for each of the microactuators (0–N) coupled to the actuator assembly 118. The inputs to each of the microactuator PID controllers 175 includes the head position 171 from the relevant head, as well as the relative position 179 of that head with respect to the voice coil motor. FIG. 6 also illustrates microactuators 158 (designated as microactuator 0–microactuator N). Each of the microactuators is shown coupled to a head 181 (head 0–head N). Also, each of the microactuators has an associated relative position sensor 183 which senses the relative position of the microactuator, relative to the voice coil motor (or actuator assembly 118). The relative position sensor 183 can include any suitable sensor, such as a capacitive sensor or any other suitable type of position sensor.

A potential problem which presents itself to the present architecture in which a plurality of data heads are simultaneously positioned is that the positioning of one data head can be affected by the simultaneous positioning of adjacent or proximate other data heads. High bandwidth positioning can excite the structural modes of the drive and cause vibration or other interference which can interfere with the positioning of adjacent data heads. Thus, in a preferred embodiment of the present invention, the servo control processor 170 or microactuator controller(s) 174 account for the movement of other data heads on actuator assembly 118.

The decentralized PID technique illustrated in FIG. 6 may optionally be preferred if only, for example, a small number of microactuators are simultaneously being positioned. However, if the number is too large, the decentralized system may provide suboptimal servo positioning and may be highly complex and difficult to tune.

Further, if each of the heads can be mechanically isolated from one another so that cross coupling does not rise to a sufficient magnitude to cause detrimental positioning, such a decentralized PID architecture may be preferred. For example, the E-block may be redesigned with stiffness and damping properties such that adjacent or proximate heads do not interact when being individually positioned.

However, without such isolation, the individual PID controller arrangement described with respect to FIG. 6 may provide suboptimal performance. A better arrangement may preferably include a single servo controller including a MIMO servo controller implemented as a digital signal processor (DSP). The DSP has inputs indicating the head position of each head, the relative position of each microactuator and the reference signal from either the host controller, or from the disc drive controller 166.

Figure 7:
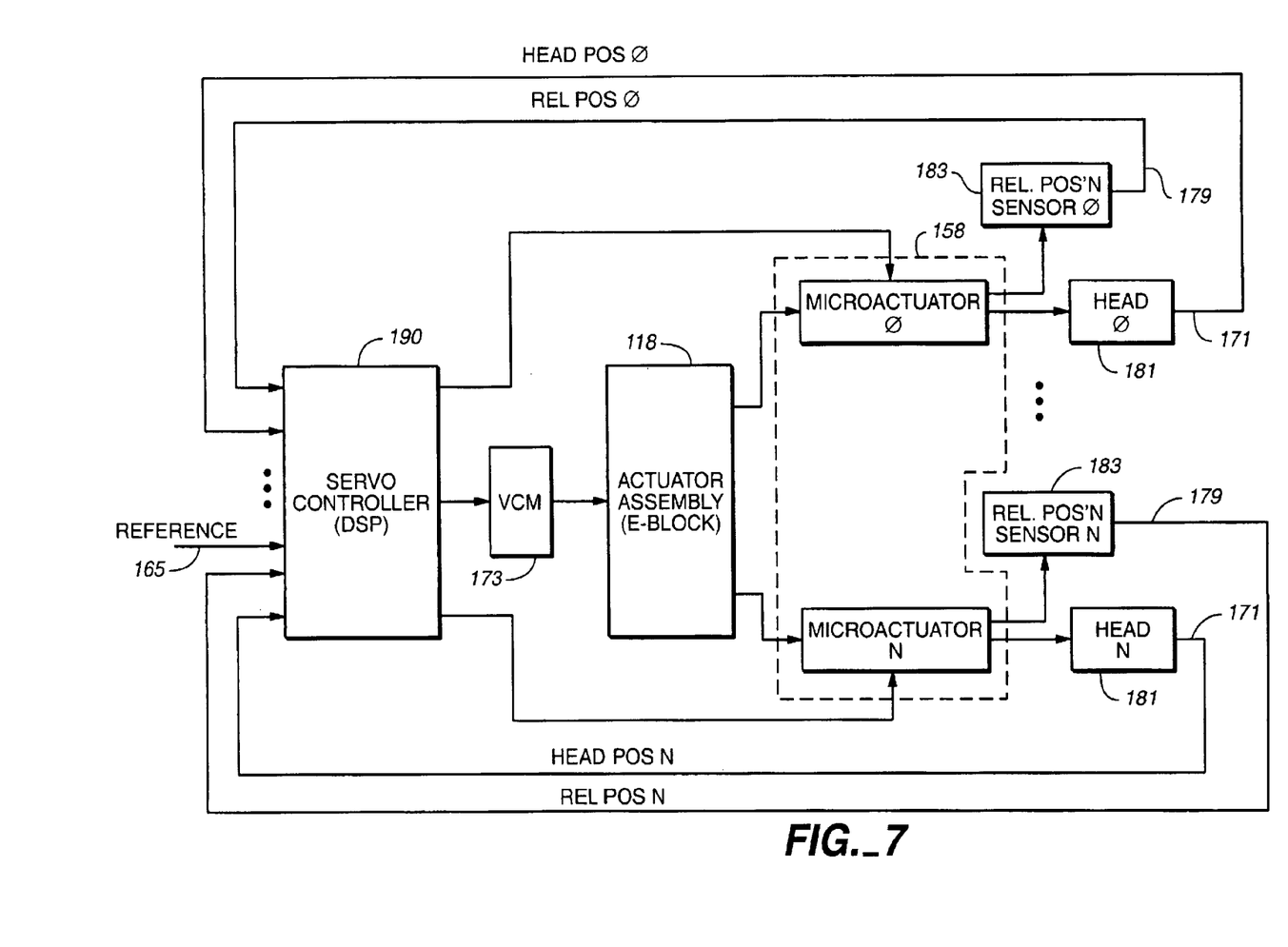
FIG. 7 is a block diagram of a portion of a servo control circuit in accordance with one embodiment of the present invention.

FIG. 7 illustrates an embodiment in which servo control processor 170 and microactuator controller 174 are combined into such a single servo controller, implemented as a DSP 190. Similar items are similarly numbered to those shown in FIG. 6. DSP 190 receives as its inputs the reference signal from the host system or disc drive controller 166, along with the head position for each head, and the relative position of the microactuators associated with each head. The outputs from DSP 190 include individual microactuator control signals associated with each microactuator 158, as well as a coarse positioning signal which is provided to the voice coil motor for positioning the entire actuator assembly 118.

In the preferred embodiment, DSP 190 not only takes into account the head position and relative position associated with each head, but also takes into account movement of adjacent or proximate heads (i.e., it takes into account cross-coupling of the heads) when providing the microactuator output for each microactuator associated with each head. In this way, DSP 190 accounts for structural mode excitation when positioning each of the individual heads.

Figure 8:
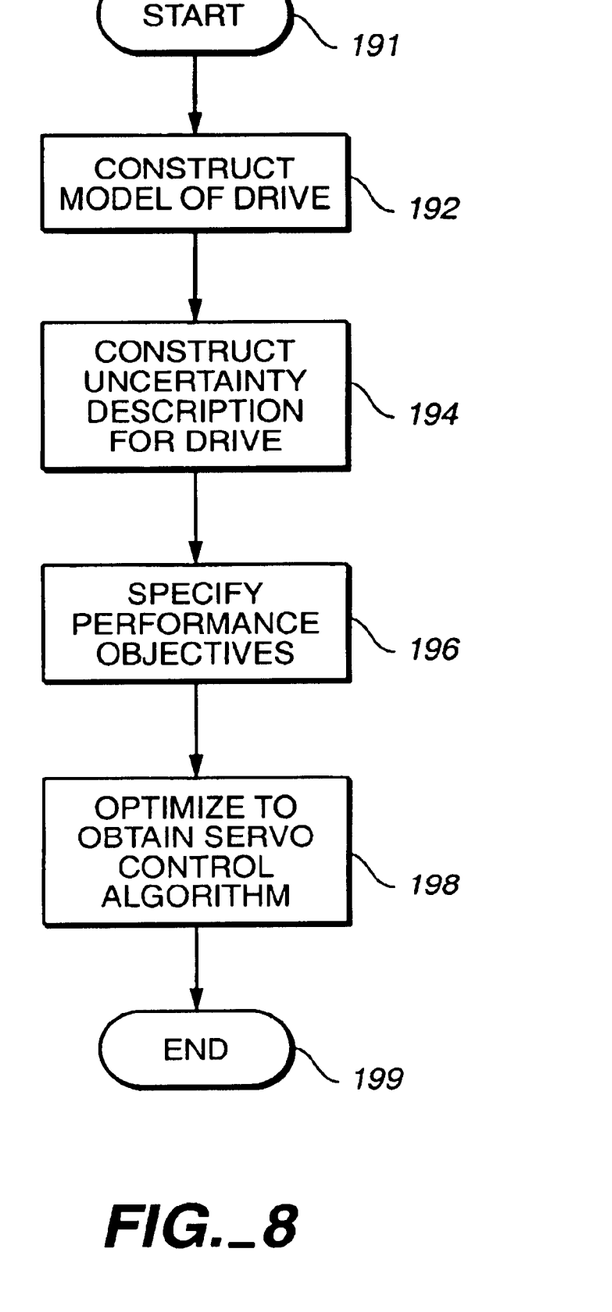
FIG. 8 is a flow diagram illustrating the construction of a servo control algorithm in accordance with one aspect of the present invention.

The DSP 190 illustrated in FIG. 7 preferably embodies a model-based algorithm. FIG. 8 (e.g., blocks 191–199) is a flow diagram illustrating one method in accordance with the present invention of developing the servo control system in which DSP 190 is implemented. A model is first constructed which is primarily a set of differential equations that describe the structural dynamics of the disc drive. This is indicated by block 192 in FIG. 8.

In constructing the model, it is preferable that precise knowledge is known about the drive dynamics. This knowledge is preferably obtained using empirical/measured data. This type of information is used to define parameters in the system model, and all of this information is preferably used to construct a model from the first principles (or differential equations).

Next, an uncertainty description is constructed for the disc drive. This is illustrated by block 194 in FIG. 8. The uncertainty description is preferably designed to capture the drive behavior, along with variations, associated with a large number of drives. This data is used to modify the model constructed in block 192.

Next, performance objectives of the system are specified. This is indicated by block 196 in FIG. 8. Such objectives are provided to ensure that the model is compatible with existing, and commercially available, tools to optimize and finalize development of the control algorithm which can be implemented in a variety of ways directly on the disc drive.

Finally, the model is optimized using commercially available optimization software. This is indicated by block 198 in FIG. 8.

It will be recognized that the specific implementation of such a control system will be different and dependent upon the specific application, drive parameters, as well as physical information which defines the drive.

It will be noted that the model-based controller does present certain advantages over a decentralized PID controller architecture, in addition to those mentioned above. For example, in a decentralized PID controller architecture, empirical data must be used to tune the controller, after it is manufactured. With the model-based controller, empirical data is used to design the model and directly synthesize the controller from the model. Therefore, the empirical data is considered at the design stage, rather than after the manufacturing stage. However, a PID controller architecture could be implemented to perform the servo control algorithms of the present invention.

It should also be noted that the algorithms described above are primarily linear. However, the present invention also contemplates the use of non-linear algorithms.

Figure 91:
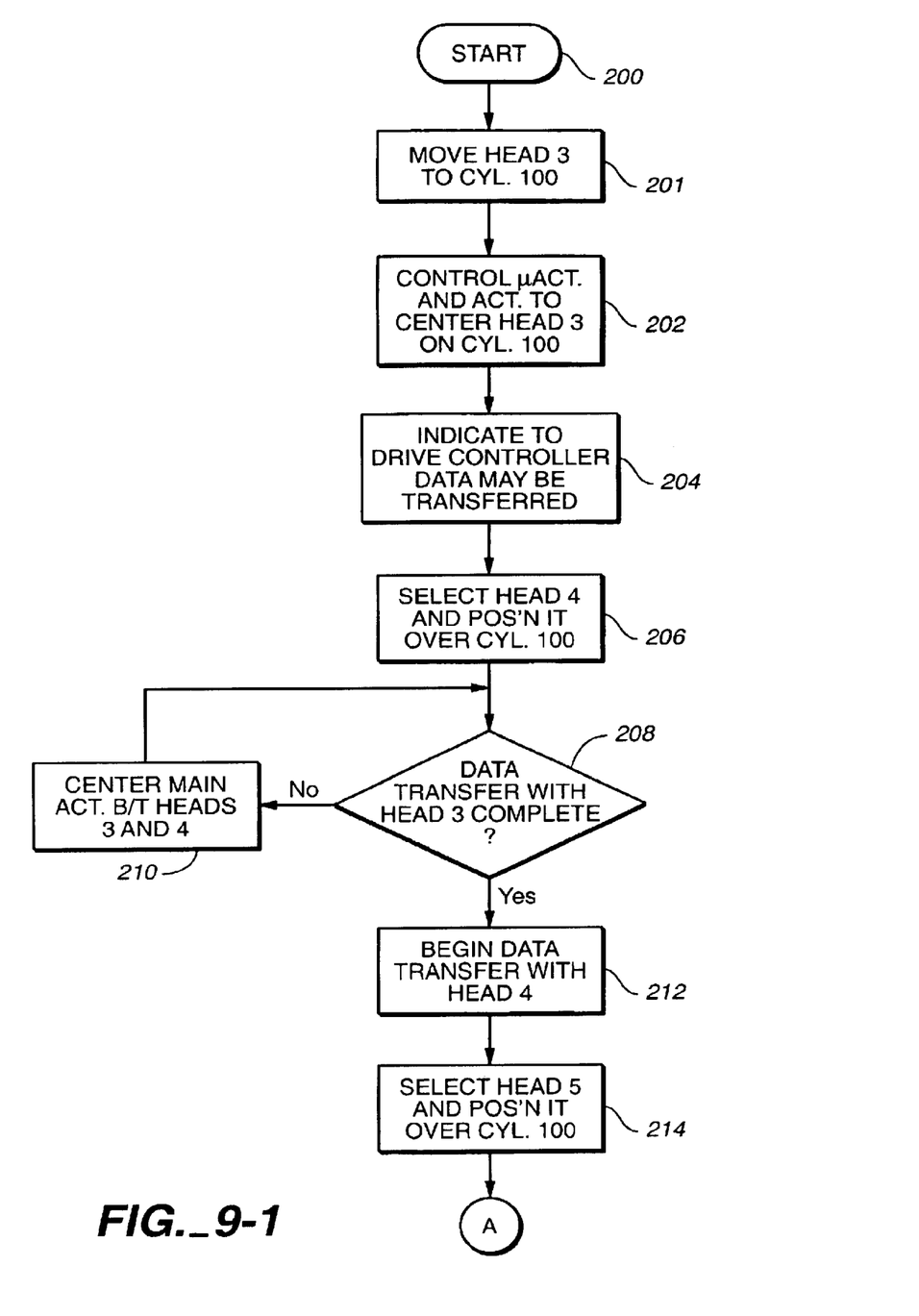
Figure 92:
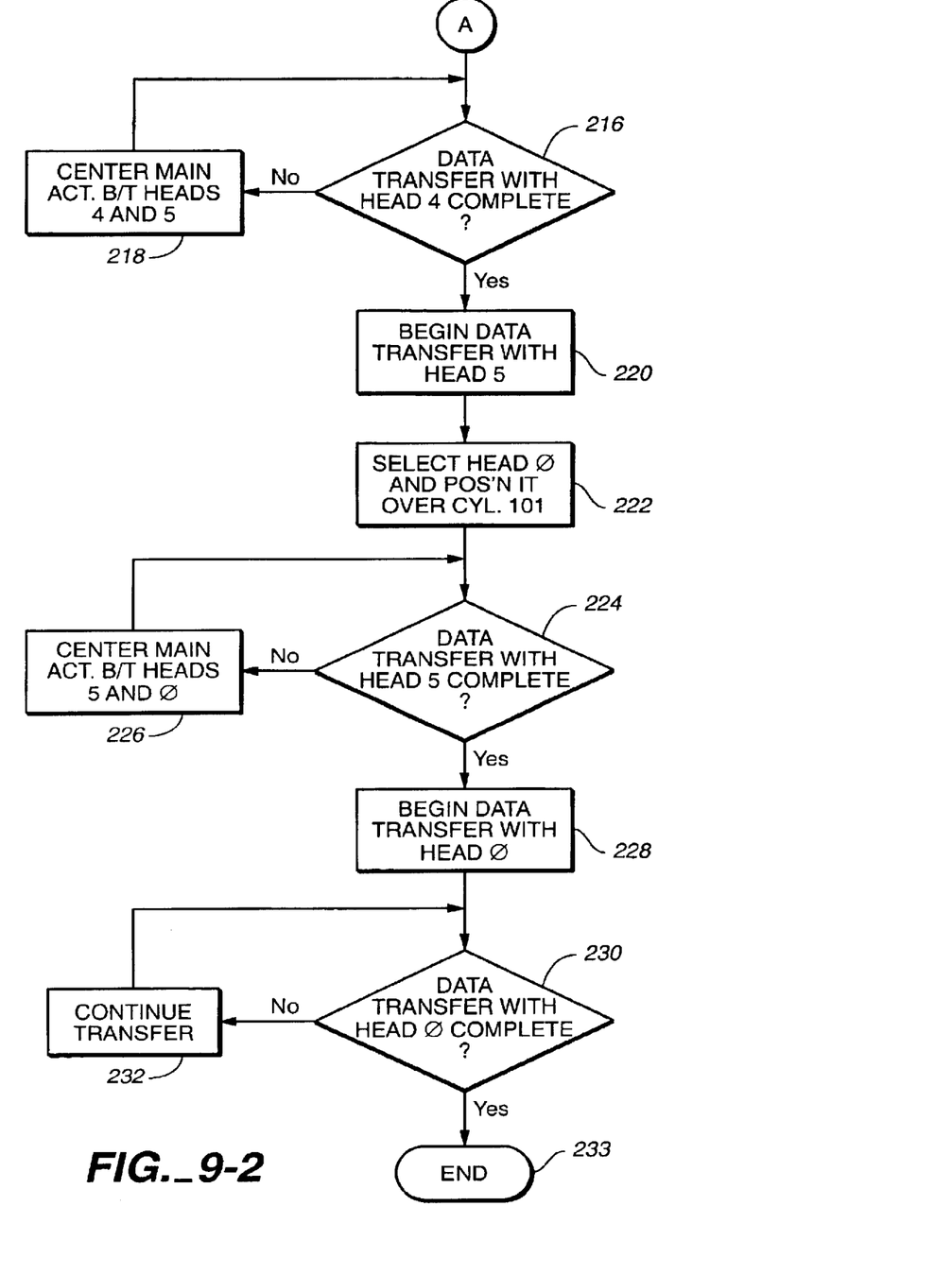

FIGS. 9-1 and 9-2 illustrate a flow diagram (e.g., blocks 200–233) which describes a sequential data transfer in accordance with one aspect of the present invention. In FIGS. 9-1 and 9-2, a sequential data transfer of data on a 6-head drive, beginning with head 3 on cylinder 100, and stopping on head 0 of cylinder 101 is illustrated. In a preferred embodiment, drive controller 166 (or the host system) first provides servo DSP 190 with the reference or command signal which causes DSP 190 to move actuator assembly 118 to a position where head 3 is over cylinder 100. This is indicated by block 201 in FIG. 9-1. Using the coarse actuator and the microactuator on head 3, servo DSP 190 finely positions head 3 to the center of the data track on its cylinder 100. Servo DSP 190 then indicates to drive controller 166 that data transfer can begin. This is indicated by blocks 202 and 204.

During the transfer of data relative to cylinder 100 using head 3, drive controller 166 selects head 4 into the servo channel. Servo DSP 190 has the time associated with one complete revolution of the disc to adjust the microactuator associated with head 4 by reading the embedded servo data with head 4 and finely position head 4 over the center of the data track on its cylinder 100. This is indicated by block 206. After head 4 has been finely positioned, and during the remainder of the data transfer using head 3, servo DSP 190 controls the main actuator to center the main actuator midway between the center of the track over which head 3 is flying on cylinder 100, and the center of the data track over which head 4 is flying on cylinder 100. This is indicated by blocks 208 and 210.

When drive controller 166 has completed the data transfer using head 3, the read/write channel is automatically switched from head 3 to head 4, and the circuitry automatically switches the servo channel connected with head 3 to be connected with head 5. DSP 190 continues to position the main actuator and the microactuator associated with head 4 in such a way that head 4 is maintained at the center of its data track on cylinder 100.

While the transfer of data using head 4 over cylinder 100 is being carried out. Servo DSP 190 begins reading the embedded servo data using head 5, and adjusts the microactuator associated with head 5 to finely position head 5 over the center of its data track on cylinder 100. This is indicated by blocks 212 and 214. After head 5 has been finely positioned (or while it is being finely positioned) and during the data transfer with head 4, servo DSP 190 centers the main actuator midway between data heads 4 and 5. This is indicated by blocks 216 and 218.

When drive controller 166 has completed transferring data with head 4, the read/write channel is automatically switched from head 4 to head 5, and the servo channel which was previously connected to head 4 is then connected to head 0. This is indicated by block 220.

Servo DSP 190 continues to position the main actuator and the microactuator associated with head 5 to keep head 5 at the center of its track over cylinder 100. While the data is being transferred with head 5 over cylinder 100 by drive controller 166, servo DSP 190 begins reading servo data from head 0 and positions head 0 over cylinder 101. Servo DSP 190 adjusts the microactuator associated with head 0 to precisely position head 0 over the center of the track associated with its cylinder 101. This is indicated block 222.

During data transfer with head 5, servo DSP 190 slowly moves the main actuator to a point midway between head 5 over cylinder 100 and head 0 over cylinder 101. When drive controller 166 completes transferring data with head 5, the read/write channel is preferably automatically switched (in hardware) from head 5 to head 0. Data transfer then begins using head 0. This is indicated by block 228. As soon as the data transfer with head 0 is complete, the sequential transfer is complete. This is indicated by blocks 230 and 232.

Figure 10:
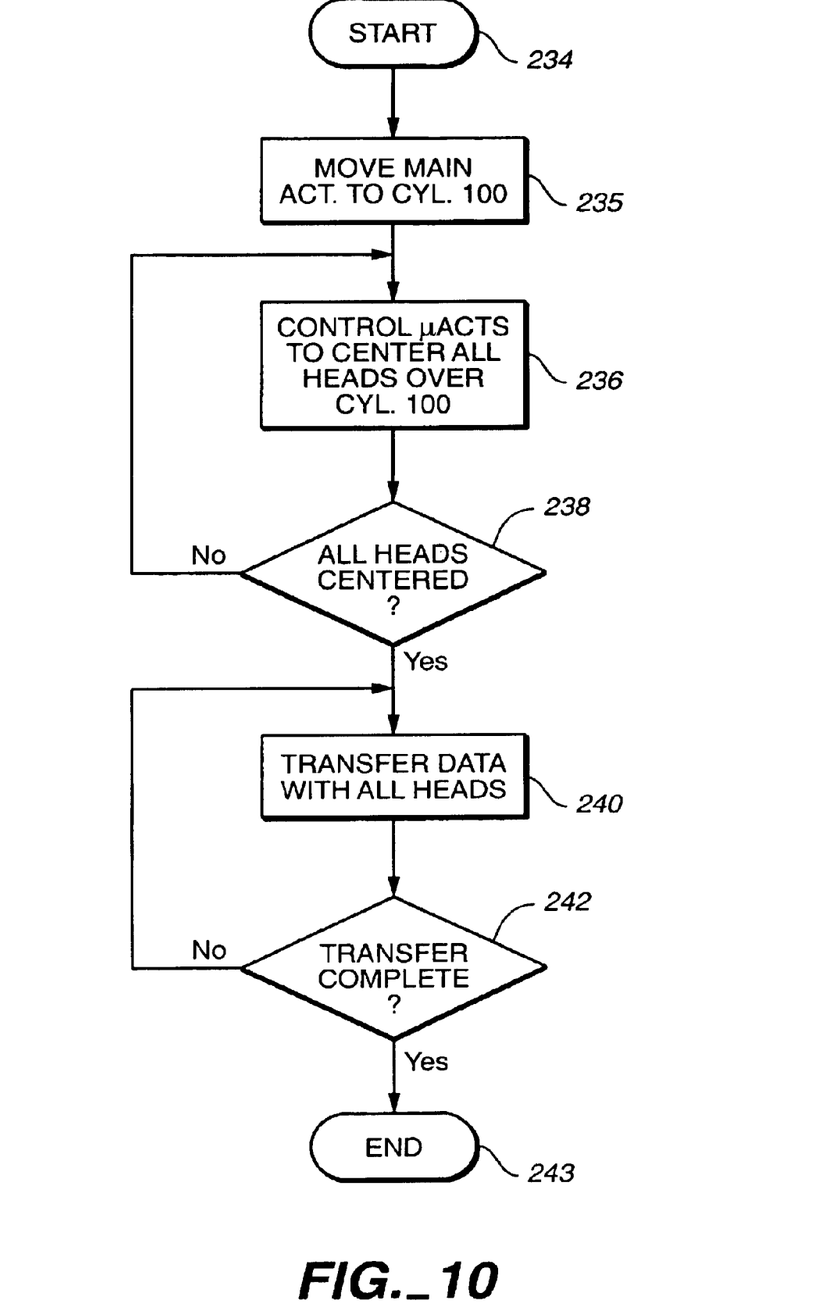
FIG. 10 is a flow diagram illustrating a track following operation and a simultaneous parallel data transfer in accordance with one aspect of the present invention.

FIG. 10 illustrates another feature of the present invention. FIG. 10 specifically illustrates (in blocks 234–243) a parallel read or write operation. First, DSP 190 receives the reference signal which indicates the particular cylinder to be accessed, and moves the main actuator such that all of the data heads are coarsely positioned over cylinder 100. This is indicated by block 235 in FIG. 10. Then, DSP 190 controls all of the microactuators to independently center all of the heads (or all of the heads for which a simultaneous parallel data transfer is to be executed) over the center of the data tracks associated with cylinder 100. Once all of the heads are centered, the simultaneous, parallel data transfer is begun. This is indicated by blocks 236, 238 and 240. When the data transfer with all of the heads is complete, the parallel transfer is ended. This is indicated by block 242.

The present invention includes a method of transferring information relative a plurality of surfaces of at least one disc 178 in a disc drive 110. The surfaces have embedded servo information thereon. The method includes providing a plurality of data heads 116, each data head corresponding to one of the plurality of disc surfaces. The data heads 116 write information to the surfaces and read information from the surfaces. The data heads 116 are simultaneously positioned relative to the corresponding surfaces using the embedded servo information. Data is simultaneously transferred relative to the corresponding surfaces using the plurality of data heads 116.

The disc drive 110 preferably includes a plurality of microactuators (0–N), at least one microactuator associated with each one of the plurality of data heads 116, and wherein simultaneously positioning includes controlling the microactuators (0–N) to move the corresponding data heads 116 based on the servo information on the corresponding surfaces. The method further preferably includes controlling the microactuators (0–N) to move each of the corresponding data heads 116 based on movement of at least one other data head 116.

Also, in the preferred embodiment, the disc drive 110 includes a coarse actuator (VCM) for coarsely positioning the plurality of data heads 116 relative to the corresponding surfaces. Controlling the microactuators (0–N) includes moving the corresponding data head 116 based on the relative positions of the coarse actuator (VCM) and each of the plurality of microactuators (0–N). The method also preferably includes sensing the relative positions of the course actuator (VCM) and each of the plurality of microactuators (0–N).

The present invention also includes a method of accomplishing an uninterrupted sequential data transfer by beginning a transfer with a first data head 116 while positioning a second data head 116 relative to an associated track. The second data head 116 begins data transfer once data transfer with the first data head 116 is completed. During data transfer with the second head, a third data head is positioned. This continues, even across track boundaries, until the sequential data transfer is completed.

In yet another embodiment of the present invention, a multiple input, multiple output servo controller 190 is provided and is coupled to each of the microactuators (0–N) and to the coarse actuator (VCM).

The data heads 116 are preferably controlled to accommodate for cross coupling between the data heads 116 which can affect positioning.

In addition, another aspect of the present invention includes implementing a servo control algorithm to configure a disc drive with a plurality of data channels. The servo control algorithm is a model-based algorithm implemented in a MIMO servo controller 190.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application or disc drive in which the present invention is implemented while maintaining substantially the same functionality without departing from the scope and spirit of the present invention.

What is claimed is:

1. A method of controlling a disc drive having a plurality of data heads wherein each of the plurality of data heads corresponds to a corresponding one of a plurality of surfaces of at least one disc in a disc drive, the surfaces having embedded servo information thereon, the disc drive further including a plurality of microactuators, one microactuator being coupled to each of the plurality of data heads, the method comprising:

simultaneously controlling movement of each of the plurality of microactuators based on the embedded servo information on each corresponding surface, and based on independent movement of another of the plurality of microactuators, to control position of the plurality of data heads relative to the corresponding disc surfaces to provide a plurality of data paths suitable for simultaneous data transfer relative to the plurality of surfaces.

2. The method of claim 1 wherein controlling position comprises:

controlling position of each of the plurality of data heads, relative to the corresponding disc surfaces, to accommodate for mechanical cross-coupling between each of the plurality of data heads and another of the plurality of data heads.

3. The method of claim 1 wherein controlling position comprises:

controlling position of each of the plurality of data heads, relative to the corresponding disc surfaces, based on movement of a plurality of other of the plurality of data heads.

4. A method of transferring information relative to a plurality of surfaces of at least one disc in a disc drive which includes a coarse actuator and a plurality of microactuators, the surfaces having embedded servo information thereon, the method comprising:

providing a plurality of data heads, one microactuator operably coupled to a corresponding one of the plurality of data heads, each data head corresponding to one of the plurality of surfaces, for writing information to the surfaces and reading information from the surfaces, the course actuator coarsely positioning the plurality of data heads relative to the corresponding surfaces;

simultaneously positioning each of the plurality of data heads relative to each other and relative to the corresponding surfaces using the embedded servo information by controlling the microactuators to move the corresponding data heads based on relative positions of the coarse actuator and each of the plurality of microactuators; and simultaneously transferring information relative to the corresponding surfaces using the plurality of data heads.

5. The method of claim 4 wherein simultaneously positioning each of the plurality of data heads comprises:

controlling the microactuators to move the corresponding data heads based on the servo information on the corresponding surfaces.

6. The method of claim 5 wherein controlling the microactuators comprises:

controlling the microactuators to move the corresponding data heads based on movement of at least one other of the data heads.

7. The method of claim 5 wherein controlling the microactuators comprises:

sensing the relative positions of the coarse actuator and each of the plurality of microactuators.

8. The method of claim 5 wherein simultaneously transferring information comprises:

simultaneously writing information to tracks on the corresponding surfaces using the plurality of data heads.

9. The method of claim 5 wherein simultaneously transferring information comprises:

simultaneously reading information from tracks on the corresponding surfaces using the plurality of data heads.

10. A method of sequentially transferring information relative to a plurality of disc surfaces of at least one disc in a disc drive, the method comprising:

positioning a first data head over a first track on a first disc surface;

beginning data transfer with the first data head relative to the first track on the first disc surface;

during data transfer to the first track on the first disc surface, positioning a second data head over a first track on a second disc surface; and after positioning the second data head, beginning data transfer with the second data head relative to the first track on the second disc surface.

11. The method of claim 10 and further comprising:

before positioning the first data head, moving the plurality of data heads relative to the disc surfaces with a main actuator based on a position of the first track on the first disc surface; and after positioning the second data head, adjusting positioning of the main actuator based on a position of the first data head and a position of the second data head.

12. The method of claim 11 wherein beginning data transfer with the second data head comprises:

beginning data transfer with the second data head after data transfer to the first track on the first disc surface is completed.

13. The method of claim 11 and further comprising:

during data transfer with the second data head, positioning a subsequent data head over a desired track on a corresponding disc surface; and after data transfer to the first track on the second disc surface is completed, beginning data transfer with the subsequent data head relative to the desired track on the corresponding disc surface.

14. The method of claim 13 and further comprising:

repeatedly positioning next subsequent data heads relative to tracks on corresponding disc surfaces, during data transfer with previous data heads, and beginning data transfer with the next subsequent data heads after data transfer relative to the tracks on the corresponding disc surfaces has been completed by previous data heads.

15. The method of claim 11 wherein the first track on the first disc surface is in a first cylinder, and wherein positioning a second data head comprises:

positioning the second data head over a track in a second cylinder during data transfer with the first data head relative to the first track in the first cylinder.

16. The method of claim 11 and further comprising:

providing first and second microactuator associated with the first and second data heads, respectively, and wherein positioning the second data head comprises positioning the second data head with the second microactuator.

17. A servo system in a disc drive having a plurality of data heads and a plurality of disc surfaces, each data head being associated with a disc surface, the servo system comprising:

a coarse actuator, coupled to the plurality of data heads to position the plurality of data heads relative to the disc surfaces;

a plurality of microactuators, one microactuator being associated with each data head; and a model-based, multiple-input, multiple-output (MIMO) servo controller providing an output signal to each of the plurality of microactuators to control position of the associated data heads by actuation of the microactuators.

18. The servo system of claim 17 wherein the MIMO servo controller comprises:

a centralized servo controller.

19. The system of claim 17 wherein the MIMO controller is coupled to the coarse actuator and provides an output signal to the coarse actuator to control position of the plurality of data heads based on actuation of the coarse actuator.

20. The system of claim 17 wherein the MIMO servo controller is configured to control position of each of the microactuators based, at least in part, on movement of another of the microactuators.

21. The system of claim 17 wherein the MIMO servo controller is configured to simultaneously position the plurality of data heads over selected tracks on the corresponding disc surfaces.

22. The system of claim 17 wherein the MIMO servo controller is configured to position each of the plurality of data heads to accomplish a continuous sequential data transfer between the data heads and the corresponding disc surfaces.

23. The system of claim 17 wherein the microactuators provide output position signals indicative of a position of the associated data heads, and wherein the MIMO servo actuator is configured to control the microactuators to position the data heads based on the output position signals.

24. The system of claim 19 and further comprising:
a plurality of relative position sensors, one relative position sensor being associated with each of the plurality of microactuators and sensing a relative position of the associated microactuator relative to the coarse actuator, the MIMO servo controller being configured to control position of the plurality of data heads based on the relative positions sensed.

25. The system of claim 19 wherein the microactuators provide an output position signals indicative of a position of the associated data heads, and wherein the MIMO servo actuator is configured to control the microactuators to position the data heads based on the output position signals.

26. The system of claim 21 and further comprising:
a plurality of relative position sensors, one relative position sensor being associated with each of the plurality of microactuators and sensing a relative position of the associated microactuator relative to the coarse actuator, the MIMO servo controller being configured to control position of the plurality of data heads based on the relative positions sensed.

* * * * *